(12) United States Patent
Obata et al.

(10) Patent No.: US 11,729,746 B2
(45) Date of Patent: Aug. 15, 2023

(54) BASE STATION, SYSTEM, AND METHOD

(71) Applicant: KABUSHIKI KAISHA TOSHIBA, Tokyo (JP)

(72) Inventors: Haruka Obata, Tokyo (JP); Toshihisa Nabetani, Kanagawa (JP); Tomoya Tandai, Tokyo (JP); Miyuki Ogura, Tokyo (JP); Tatsuma Hirano, Kanagawa (JP); Tsuyoshi Kogawa, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 17/187,901

(22) Filed: Mar. 1, 2021

(65) Prior Publication Data
US 2021/0352630 A1  Nov. 11, 2021

(30) Foreign Application Priority Data

May 11, 2020 (JP) .................................. 2020-083217

(51) Int. Cl.
*H04W 72/04* (2023.01)
*H04W 48/08* (2009.01)
(52) U.S. Cl.
CPC ........... *H04W 72/04* (2013.01); *H04W 48/08* (2013.01)

(58) Field of Classification Search
CPC .............................. H04W 72/04; H04W 48/08
USPC ........................................................... 370/329
See application file for complete search history.

(56) References Cited

U.S. PATENT DOCUMENTS

| | | | |
|---|---|---|---|
| 2013/0244640 A1* | 9/2013 | Viorel ............... | H04W 56/0045 455/422.1 |
| 2018/0359337 A1* | 12/2018 | Kodaypak ........... | H04L 41/0897 |
| 2019/0098535 A1 | 3/2019 | Fujishiro | |
| 2019/0174406 A1* | 6/2019 | Hwang ................ | H04B 17/318 |
| 2021/0251032 A1* | 8/2021 | Wang .................... | H04W 76/15 |
| 2022/0201601 A1* | 6/2022 | Cai ......................... | H04W 8/18 |

FOREIGN PATENT DOCUMENTS

JP           6510156           5/2019

* cited by examiner

*Primary Examiner* — Faisal Choudhury
(74) *Attorney, Agent, or Firm* — Holtz, Holtz & Volek PC (57) ABSTRACT

According to one embodiment, a base station communicably connected to a wireless terminal is provided. The base station includes a processor and a transmitter. The processor is configured to acquire communication condition information indicating conditions of wireless communication with the wireless terminal. The transmitter is configured to transmit the communication condition information to a system managing a first network slice and a second network slice which can be used by the base station.

18 Claims, 3 Drawing Sheets

BASE STATION, SYSTEM, AND METHOD

CROSS-REFERENCE TO RELATED APPLICATIONS

This application is based upon and claims the benefit of priority from Japanese Patent Application No. 2020-083217, filed May 11, 2020, the entire contents of which are incorporated herein by reference.

FIELD

Embodiments described herein relate generally to a base station, a system, and a method.

BACKGROUND

Recently, review of the 5G (fifth generation) mobile communication system has been advanced in the Third Generation Partnership Project (3GPP).

The 5G mobile communication system is based on connection of various things via a network and needs to respond to wide range requirements (conditions) such as high speed, massive connectivity and low latency.

For this reason, the network may be complicated and efficient communication may not be able to implemented in the 5G mobile communication system.

DETAILED DESCRIPTION

In general, according to one embodiment, a base station communicably connected to a wireless terminal is provided. The base station includes a processor and a transmitter. The processor is configured to acquire communication condition information indicating conditions of wireless communication with the wireless terminal. The transmitter is configured to transmit the communication condition information to a system managing a first network slice and a second network slice which can be used by the base station.

Various embodiments will be described hereinafter with reference to the accompanying drawings.

It is assumed that the base station and the management system according to an embodiment are used in, for example, a mobile communication system such as a 5G mobile communication system whose review has been advanced in 3GPP.

The 5G mobile communication system needs to respond to wide range requirements such as high speed (large capacity), massive connectivity (multiple connection), and low latency (high reliability). In response to characteristics of such various requirements (requests and communication service), a technology referred to as a network slice (network slicing) managing or operating the system by logically dividing the architecture or resources (hereinafter referred to as a network slicing technology) has been developed.

According to the network slicing technology, a plurality of logical sections (network slices) can be set on a common hardware resource (server or router) arranged in the network and each of the network slices can be operated independently. Complication of the network can be avoided and an efficient network can be configured by allocating such network slices to the respective services provided in the mobile communication system. In addition, in the network slicing technology, the use efficiency of the entire resource can be improved since the common hardware resource is virtually divided and allocated to a plurality of network slices.

However, the optimum communication performance of the entire mobile communication system may not be able to be achieved by only allocating the network slices, based on the service quality provided in the mobile communication system.

Thus, the present embodiment provides a system for implementing more efficient communication in the mobile communication system to which the network slicing technology is applied as described above.

Figure 1:
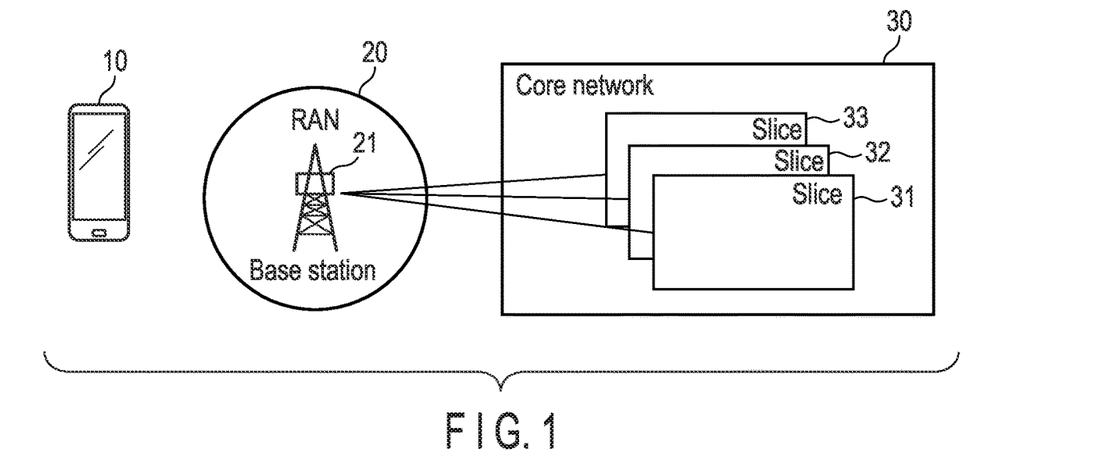
FIG. 1 is a diagram schematically showing a network architecture of a mobile communication system according to an embodiment.

FIG. 1 schematically shows a network architecture of a mobile communication system according to the present embodiment. As shown in FIG. 1, a mobile communication system 1 includes a wireless terminal 10 (UE: User Equipment), a wireless access network 20 (RAN: Radio Access Network), and a core network 30.

The wireless terminal 10 is a terminal device (i.e., a mobile terminal or the like) executing wireless communication and is used by, for example, a user or the like. For example, the wireless terminal 10 executes communication using the wireless access network 20 and the core network 30, in response to requirements (conditions) from a predetermined application program which runs on the wireless terminal 10 when using the service provided in the mobile communication system. Incidentally, the requirements from the application program include, for example, a permissible latency, information on the degree of importance and the security, and the like.

The wireless access network 20 is located between the wireless terminal 10 and the core network 30 and is configured by a base station 21, a wireless line control device (not shown), and the like. The base station 21 executes wireless communication with the wireless terminal 10 located in a range (cell) which the base station 21 covers. Incidentally, only one wireless terminal 10 is shown in FIG. 1. However, the base station 21 can execute wireless communication with a plurality of wireless terminals 10.

In addition, the base station 21 can obtain information such as the number of wireless terminals 10 connected to the base station 21, the Modulation and Coding Scheme (MCS) used in data communication with the wireless terminal 10, transmission characteristics (i.e., transmission speed, error rate, retransmission rate, and traffic volume in the wireless communication) in physical layers, the number of antennas provided in the wireless terminal 10 and the base station 21, the number of Multiple-Input and Multiple-Output (MIMO) streams, and the Received Signal Strength Indication (RSSI).

The core network 30 is a network which the base station 21 configuring the wireless access network 20 can use, and is connected to the base station 21. The base station 21 can be connected to, for example, the Internet (not shown) or the like via a core network 30. The core network 30 is also referred to as, for example, a backbone.

The core network 30 is assumed to be logically divided into a plurality of network slices and managed by the above-described network slicing technology. In other words, the core network 30 is configured by a plurality of network slices. Incidentally, in the example shown in FIG. 1, the core network 30 is configured by network slices 31 to 33.

An identifier (i.e., identification information for identifying the network slice) referred to as Single-Network Slice Selection Assistance Information (S-NSSAI) is assigned to each of the plurality of network slices. S-NSSAI corresponds to, for example, a network slice name (network slice information). Incidentally, S-NSSAI can be held (commonly used) by the wireless terminal 10, the wireless access network 20, and the core network 30. In other words, in the 5G mobile communication system, the wireless terminal 10, the wireless access network 20, and the core network 30 are controlled by using S-NSSAI (the network slice to which S-NSSAI is assigned).

In addition, different services (types) are assigned to the plurality of network slices configuring the core network 30, respectively. As the service type (SST) assigned to the network slices, high speed and large capacity (eMBB: enhanced Mobile Broadband), massive connectivity (mMTC: massive Machine Type Communication), and low delay and high reliability (URLLC: Ultra Reliable and Low Latency Communications) are defined in 3GPP.

When the core network 30 is configured by the network slices 31 to 33 as shown in FIG. 1, the network slices can be configured such that the network slice 31 provides eMBB, the network slice 32 provides mMTC, and the network slice 33 provides URLLC.

That is, a plurality of network slices can be configured to have different communication characteristics, respectively.

Incidentally, the network slices can be set uniquely. The network slices can also be remade in response to conditions. In addition, the service types assigned to the network slices can also be set uniquely by the system. Incidentally, operations of the network slice to which each service type is assigned is not defined under standard specifications and depend on implementation.

In addition, the above-explained wireless terminal 10 executes communication using one of a plurality of network slices configuring the core network 30, but can execute communication using two or more network slices.

Incidentally, in the present embodiment, it has been described that the core network 30 is logically divided. However, the core network 30 may be divided physically. Furthermore, several functions of the core network 30 may be divided logically and the other functions may not be divided (but shared by a plurality of services).

Figure 2:
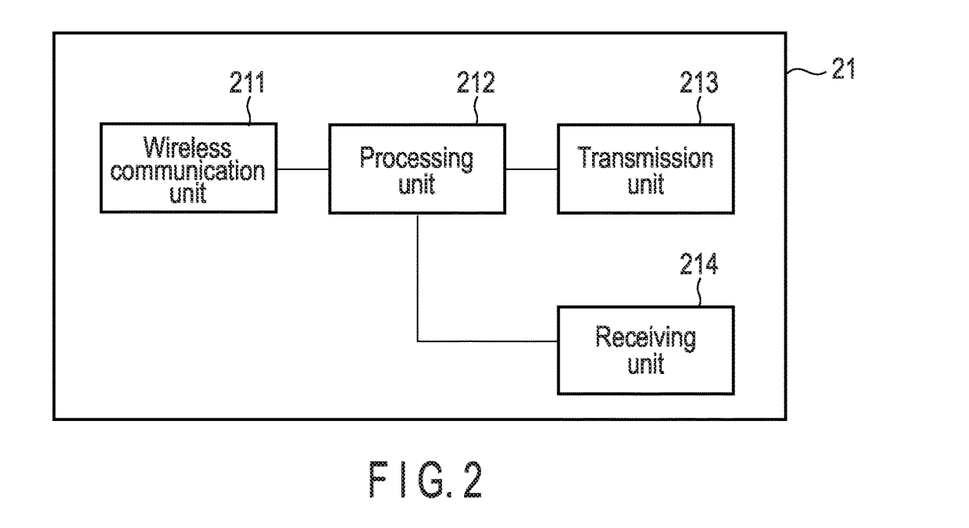
FIG. 2 is a diagram showing an example of a configuration of a base station constituting a wireless access network.

FIG. 2 is a diagram showing an example of a configuration of the base station 21 constituting a wireless access network 20 shown in FIG. 1. As shown in FIG. 2, the base station 21 includes a wireless communication unit 211, a processing unit 212, a transmitting unit 213, and a receiving unit 214.

Incidentally, the wireless communication unit 211 shown in FIG. 2 is implemented by a wireless communication device, an antenna, and the like provided at the base station 21, the transmitting unit 213 and the receiving unit 214 are implemented by, for example, communication devices, processors or the like including wires, and the processing unit 212 is implemented by various processors and the like provided at the base station 21.

The wireless communication unlit 211 executes communication with the wireless terminal 10 and receives wireless signals transmitted from the wireless terminal 10. In addition, the wireless communication unit 211 transmits data provided in the mobile communication system to the wireless terminal 10.

The processing unit (processor) 212 analyzes the wireless signals received by the wireless communication unit 211 and acquires communication condition information indicating the condition of the wireless communication with the wireless terminal 10. The communication condition information includes the number of wireless terminals 10 connected to the base station 21, transmission characteristics in physical layers, received signal strength indication, and the like. In addition, the communication condition information further includes other information managed at the base station 21 (i.e., MCS used for data transmission with the wireless terminal 10, the number of antennas provided at the wireless terminal 10 and the base station 21, the number of MIMO streams, and the like).

The transmitting unit (transmitter) 213 transmits the communication condition information acquired by the processing unit 212 to a management system which manages the above-explained network slices.

The receiving unit (receiver) 214 receives from the management system an identifier assigned to the network slice selected in the management system based on the communication condition information transmitted from the base station 21 (transmitting unit 213).

Incidentally, when the identifier is received by the receiving unit 214, the processing unit 212 executes a process of allocating a wireless resource corresponding to (the network slice which is assigned) the identifier to the wireless terminal 10.

Figure 3:
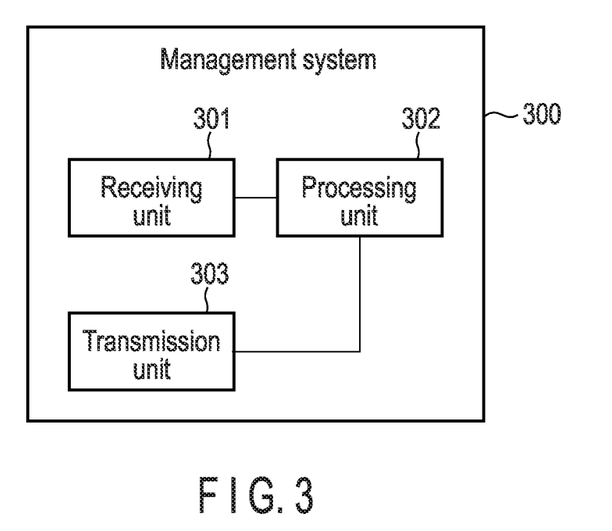
FIG. 3 is a diagram showing an example of an architecture of a management system managing a plurality of network slices that configure a core network.

FIG. 3 is a diagram showing an example of an architecture of a management system 300 managing the plurality of network slices that configure the core network 30 shown in FIG. 1. The management system 300 shown in FIG. 3 exists in the core network 30 and includes a receiving unit 301, a processing unit 302, and a transmitting unit 303.

Incidentally, the receiving unit 301 and the transmitting unit 303 shown in FIG. 3 are implemented by, for example, communication devices, processors or the like including wires included in hardware resources arranged in the core network 30, and the processing unit 302 is implemented by various processors and the like included in the hardware resource arranged in the core network 30.

The receiving unit (receiver) 301 receives the communication condition information transmitted from (the transmitting unit 213 included in) the base station 21.

The processing unit (processor) 302 executes a process of selecting the network slice (allocated to the wireless terminal 10) used by the wireless terminal 10, from a plurality of network slices logically divided by the core network 30, based on the communication condition information received by the receiving unit 301.

The transmitting unit (transmitter) 303 transmits to the base station 21 the identifier assigned to the network slice selected by the processing unit 302 (i.e., the identification information for identifying the network slice).

Figure 4:
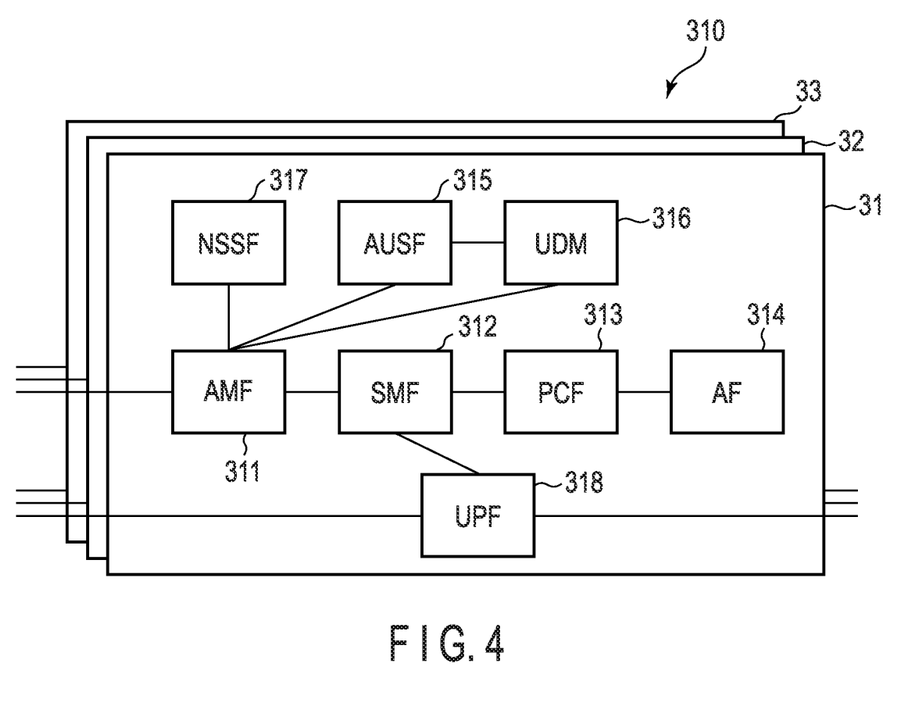
FIG. 4 is a diagram showing an example of an architecture of a management system in a case where the mobile communication system of the embodiment is a 5G mobile communication system.

FIG. 4 shows functional blocks configuring the management system (each of network slices 31 to 33) in a case where the mobile communication system according to the present embodiment is the 5G mobile communication system.

As shown in FIG. 4, the functional blocks configuring a management system 310 include Access and Mobility Function (AMF) 311, Session Management Function (SMF) 312, Policy Control Function (PCF) 313, Application Function (AF) 314, Authentication Server Function (AUSF) 315, User Data Management (UDM) 316, Network Slice Selection Function (NSSF) 317, and User Plane Function (UPF) 318.

Incidentally, in 3GPP, C/U split of splitting and processing Control Plane (C-Plane) for communication of control signals on establishment of communication and the like and User Plane (U-Plane) for communication of the user data is adopted.

AMF 311, SMF 312, PCF 313, AF 314, AUSF 315, UDM 316, and NSSF 317 belong to the C-Plane, and UPD 318 belongs to the U-Plane.

The AMF 311 provides authentication, authorization, mobility management, and the like of the wireless terminal 10 (UE).

The SMF 312 is in charge of session management of the wireless terminal 10, and assignment of the IP address, selection and control of the UPF 318 for data transfer. When the wireless terminal 10 establishes a plurality of sessions, each of the sessions can be managed independently. In this case, different DMF 312 can be assigned to each session to use a different function for each session. Incidentally, in the core network 30 of the 5G mobile communication system, the management on the wireless terminal 10 is executed by one AMF 311, and the traffic is processed by the SMF 312 for each network slice. The SMF 312 is controlled by the AMF 311.

The PCF 313 holds various policies and rules and provides the C-Plane function for execution of policies.

The AF 314 provides the information on a packet flow to the PCF 313 providing the C-Plane function, to support Quality of Service (QoS). The PCF 313 determines the mobility for appropriately operating the AMF 311 and the SMF 312 and the policy on the session management, based on the information.

The AUSF 315 stores data for authentication of the wireless terminal 10, and the UDM 316 stores contract information of the wireless terminal 10. Incidentally, Data Network provides access to the Internet, which is not included in the core network 30 of the 5G mobile communication system. The UDM 316 stores subscriber contract information and authentication information.

The NSSF 317 selects appropriate S-NSSAI (network slice) providing the service to the wireless terminal 10. In general, the NSSF 317 selects S-NSSAI from (the information of) the type or service type of the wireless terminal 10. Incidentally, in the mobile communication system (5G mobile communication system) according to the present embodiment, the NSSF 317 corresponds to the processing unit 302 shown in FIG. 3.

The UPF 318 executes routing transfer of user packets and provides a function of connection point to the network, an anchor point function at handover, an execution function of policy control, and a monitoring function of a traffic use fee.

Next, an example of the procedure of the mobile communication system according to the present embodiment will be described with reference to a sequence chart of FIG. 5. Incidentally, a plurality of network slices configuring the core network 30 are assumed to be generated in advance in accordance with the service (type) and the like provided by the mobile communication system.

First, when the user using the wireless terminal 10 uses the service provided in the mobile communication system, an application program (hereinafter referred to as a target application) corresponding to the service is started at the wireless terminal 10 (step S1). The wireless terminal 10 at which the target application is started is hereinafter referred to as a target wireless terminal 10.

When the process of step S1 is executed, the target wireless terminal 10 transmits the wireless signal to the base station 21 for establishment of the communication with the base station 21 or the like (step S2).

The wireless communication unit 211 included in the base station 21 receives the wireless signal transmitted from the target wireless terminal 10. The processing unit 212 included in the base station 21 acquires (collects) the communication condition information, based on the wireless signal from the wireless terminal 10 received by the wireless communication unit 211 (step S3). The communication condition information acquired in step S3 includes information on the physical layer of wireless communication between the target wireless terminal 10 and the base station 21.

More specifically, the base station 21 receives the wireless signals from a plurality of wireless terminals 10 including the target wireless terminal 10 connected to the base station 21, and the processing unit 212 thereby acquires the number of wireless terminals 10 connected to the base station 21 as the communication condition information.

In addition, data transmission is executed between the target wireless terminal 10 and the base station 21. The processing unit 212 acquires the transmission speed, error rate, latency, retransmission rate, traffic volume in physical layer, RSSI and the like (transmission characteristics in physical layer) of the data as the communication condition information.

Furthermore, the communication condition information acquired in step S3 may further include MCS used for data communication with the target wireless terminal 10, the number of antennas provided at the target wireless terminal 10 and the base station 21, the number of MIMO streams, the frequency and time which can be used for wireless communication, and the like. Incidentally, the information may be managed in advance at the base station 21 or may be acquired from the target wireless terminal 10 or the like. In addition, the information may be changed at any time in accordance with the transmission characteristics in physical layer.

The communication condition information of the present embodiment may include, for example, at least one of the number of wireless terminals, transmission rate, error rate, latency, retransmission rate, traffic volume in physical layer, and the number of antennas. Several elements of the above information may be omitted or information other than the above information may be further included in the communication condition information.

When the process in step S3 is executed, the transmitting unit 213 included in the base station 21 transmits the communication condition information acquired in step S3 to the management system 300 managing a plurality of network slices configuring the core network 30 (step S4).

The receiving unit 301 included in the management system 300 receives the communication condition information transmitted from the base station 21 in step S4.

The processing unit 302 included in the management system 300 selects the network slice used by the target wireless terminal 10 (i.e., appropriate network slice for the target wireless terminal 10), from a plurality of network slices configuring the core network 30, based on the received communication condition information (step S5).

Incidentally, the network slice is selected based on at least the communication condition information in the present embodiment. In addition to the communication condition information, however, service type information allocated to each network slice may be used for the selection of the network slice. In this case, for example, the service type suitable to the target application may be specified based on requirements on the wireless communication based on the target application (i.e., requirements from the target application) and the network slice to which the specified service type is allocated may be selected. Furthermore, the network slice may be selected by using, for example, the type or the like of the target wireless terminal 10. Incidentally, the request from the target application and the type of the target wireless terminal 10 may be acquired from the target wireless terminal 10 via the base station 21.

In addition, the selection of the network slice may be executed by, for example, using Artificial Intelligence (AI) such as machine learning, table determination, threshold determination or the like. That is, in the present embodiment, the network slice may be selected based on the communication condition information, and its selection algorithm is not limited.

When the process in step S5 is executed, the transmitting unit 303 included in the management system 300 transmits the identifier (S-NSSAI) assigned to the network slice selected in step S5 to the base station 21 (step S6).

The receiving unit 214 included in the base station 21 receives the identifier transmitted from the management system 300 in step S6. The processing unit 212 included in the base station 21 allocates a wireless resource to the target wireless terminal 10, based on the (network slice identified by) the identifier received by the receiving unit 214 (step S7).

That is, in the present embodiment, when the identifier for identifying, for example, the network slice 31 is received by the receiving unit 214, the wireless resource is allocated to the target wireless terminal 10 based on (the policy corresponding to the network slice 31 which is assigned) the identifier. However, when the identifier for identifying, for example, a network slice 32 is received by the receiving unit 214, the wireless resource is allocated to the target wireless terminal 10 based on (the policy corresponding to the network slice 32 which is assigned) the identifier.

Incidentally, the wireless resource allocated to the target wireless terminal 10 includes the time, frequency, and the like that can be used in the wireless communication by the target wireless terminal 10.

When the process of step S7 is executed, the target wireless terminal 10 executes wireless communication using the wireless resource allocated by the base station 21.

Figure 5:
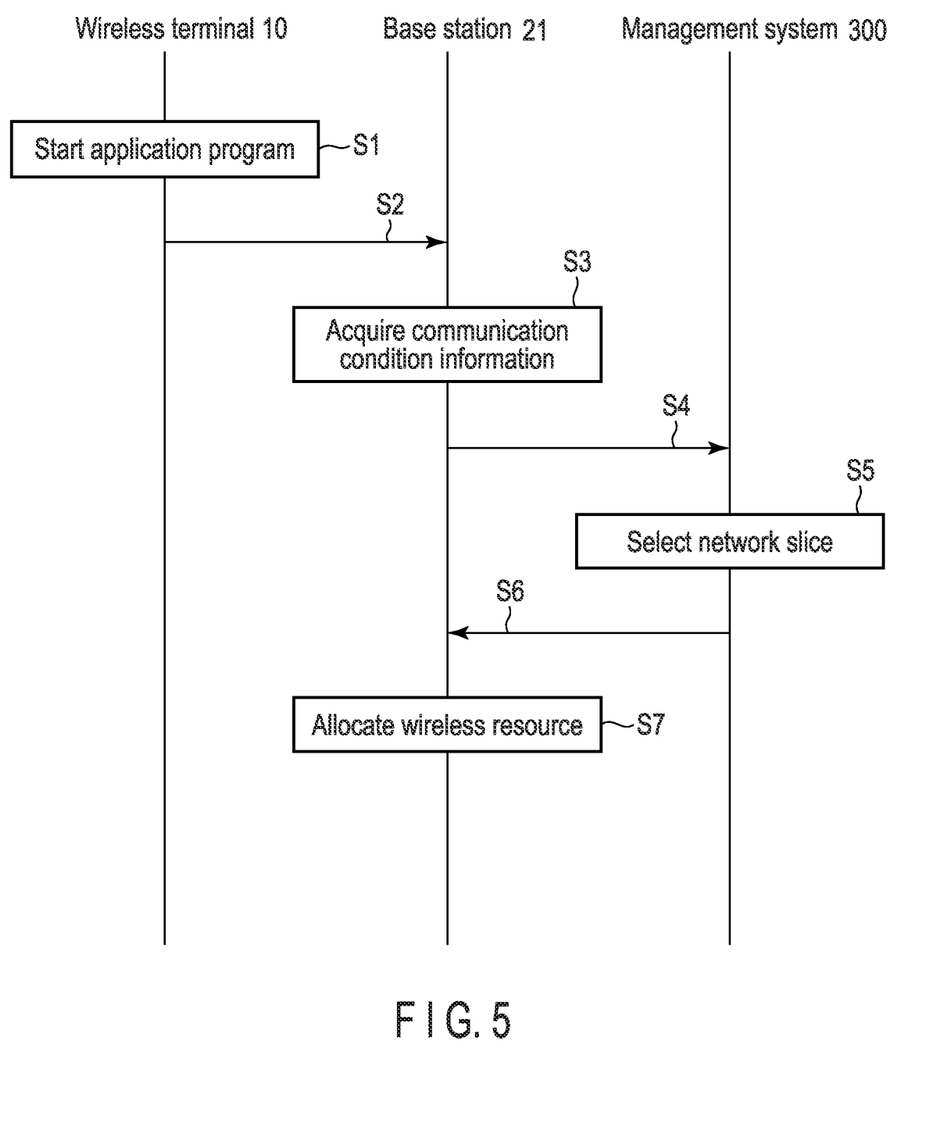
FIG. 5 is a sequence chart showing an example of a procedure of the mobile communication system according to the embodiment.

In the present embodiment, the network slice can be selected in consideration of the wireless communication condition by executing the process shown in FIG. 5. A concrete example of selection of the network slice will be described below in brief.

For example, when the latency permitted in the wireless communication executed by running the target application is 50 msec, two wireless terminals (hereinafter referred to as first and second wireless terminals) running the target application are assumed to exist.

The first wireless terminal 10 is assumed to execute wireless communication using low MCS since the condition of wireless communication with the base station 21 is bad. In contrast, the second wireless terminal 10 is assumed to execute wireless communication using high MCS since the condition of wireless communication with the base station 21 is good.

In this case, since the time required to transmit and receive the same data volume is longer in the first wireless terminal 10 than that in the second wireless terminal 10, the first wireless terminal 10 desirably uses network slice executing a higher speed process.

Therefore, the network slice capable of executing a comparatively higher speed process is selected for the first wireless terminal 10, and the network slice capable of executing a lower speed process is selected for the second wireless terminal 10.

Incidentally, the performance (whether high-speed processing can be executed, or the like) of the network slice is different depending on the hardware resource (calculation resource) allocated to the network slice. More specifically, the network slice to which a large number of calculation resources are allocated can execute high-speed processing, but the network slice to which a small number of calculation resources are allocated cannot execute high-speed processing.

In addition, the performance of the network slice is also different depending on, for example, the location where the network slice is configured. More specifically, for example, the network slice configured at a location physically close to the base station 21 can implement high-speed processing.

Incidentally, (the information on) the performance on each of a plurality of network slices configuring the core network 30 is assumed to be managed in, for example, the management system 300. According to this, when selecting the network slice used by the wireless terminal 10 in the management system 300, the information on the performance of each of a plurality of network slices can be used.

Selecting the network slice by using the MCS included in the communication condition information has been described. For example, however, when the number of antennas provided at the first wireless terminal 10 is smaller than the number of antennas provided at the second wireless terminal 10, the network slice capable of executing comparatively high-speed processing can be selected.

The network slice used by the target wireless terminal 10 can be selected by using the other information included in the communication condition information or can be selected by totally considering the conditions of wireless communication indicated by the communication condition information, although detailed descriptions are omitted.

As described above, at the base station 21 according to the present embodiment, the communication condition information indicating the conditions of wireless communication with the wireless terminal 10 is acquired and transmitted to the management system 300 managing a plurality of network slices (first and second network slices) that can be used by the base station 21.

In addition, in the management system 300 according to the present embodiment, the process of selecting the network slice used by the wireless terminal 10 (i.e., allocated to the wireless terminal 10) from a plurality of network slices that can be used by the base station 21 is executed and the identifier (identification information) for identifying the selected network slice is transmitted to the base station 21, based on the communication condition information received from the base station 21.

In the present embodiment, this configuration enables the management system 300 to recognize the conditions of wireless communication between the wireless terminal 10 and the base station 21 and to select the network slice used by the wireless terminal 10 in consideration of the conditions, by referring to the notification from the base station 21. According to this, since the desired requirements (i.e., requirements on the application programs running at the wireless terminal 10) can be efficiently satisfied, more efficient communication can be implemented as compared with the configuration of merely allocating the network slices based on the quality (type) and the like of the service provided by the mobile communication system.

Incidentally, the identifier for identifying the network slice used by the wireless terminal 10 is received from the management system 300 at the base station 21. For example, when a first identifier (first identification information) for identifying the first network slice is received, a wireless resource (i.e., a first wireless resource) is allocated to the wireless terminal 10 based on the first identifier. In contrast, for example, when a second identifier (second identification information) for identifying the second network slice is received, a wireless resource (i.e., a second wireless resource different from the first wireless resource) is allocated to the wireless terminal 10 based on the second identifier. In the present embodiment, the configuration enables the wireless resource corresponding to the network slice selected in the management system 300 to be allocated from the base station 21 to the wireless terminal 10 and enables communication appropriate for the mobile communication system to be implemented.

In addition, in the present embodiment, the communication condition information includes the information on the physical layer of wireless communication between the target wireless terminal 10 and the base station 21. More specifically, the communication condition information (i.e., information on the physical layer) includes at least one of the number of wireless terminals 10 connected to the base station 21, the transmission speed, error rate, latency, retransmission rate, and traffic volume of the wireless communication, and the number of antennas provided at the wireless terminal 10 and the base station 21. According to the communication condition information, the appropriate network slice can be selected in consideration of the conditions of wireless communication.

Furthermore, in the present embodiment, the core network 30 is logically divided into a plurality of network slices and managed. One network slice (first network slice) of the plurality of network slices has, for example, the communication characteristics including at least one of high speed, multiple connection, and low latency, and the other network slice (second network slice) has, for example, the communication characteristics which include at least one of high speed, multiple connection, and low latency and which are different from those of the first network slice. In the present embodiment, efficient communication can be implemented by selecting the appropriate network slice from the plurality of network slices.

In addition, selecting the network slice based on the communication condition information has been described in the present embodiment. The base station 21 acquires from the wireless terminal 10 the requirements on wireless communication based on the application program running at the wireless terminal 10 (i.e., the requirements from the application program) and transmits the requirements to the management system 300. The management system 300 receives the requirements from the application program transmitted from the base station 21 and selects the network slice used by the wireless terminal 10 based on the requirements. In the present embodiment, the configuration enables the network slice suitable to the application program running at the wireless terminal 10 (i.e., the service provided in the mobile communication system) to be selected.

In the present embodiment, the appropriate network slice can be selected by considering the conditions of wireless communication between the wireless terminal 10 and the base station 21. However, the conditions of wireless communication between the wireless terminal 10 and the base station 21 are often changed. For this reason, when the conditions of wireless communication are changed after the network slice is once selected, the network slice used by the wireless terminal 10 may be changed (switched) in accordance with the change. In this case, for example, the processing unit 302 included in the management system 300 may be configured to detect the change in the conditions of wireless communication based on the communication condition information and to change the network slice.

More specifically, when the communication speed is made lower by the change in the conditions of wireless communication between the wireless terminal 10 and the base station 21, the network slice (first network slice) used by the wireless terminal 10 may be changed to the network slice (second network slice) capable of higher speed processing.

In contrast, when margin occurs in the latency by the change in the conditions of wireless communication between the wireless terminal 10 and the base station 21, the network slice used by the wireless terminal 10 may be changed to the network slice of lower speed processing.

In addition, when a plurality of wireless terminals 10 using the same network slice exist and when the conditions of wireless communication are changed, only network slices used by several wireless terminals 10 of the plurality of wireless terminals 10 may be changed in accordance with the change.

Furthermore, when the number of wireless terminals 10 using the same network slice increases, network slices used by several wireless terminals 10 of the plurality of wireless terminals 10 using the same network slice may be changed.

In addition, network slices used by the other wireless terminal 10 can also be used by changing the network slice used by the wireless terminal 10.

Incidentally, when the network slice is changed as described above, the identifier for identifying the changed network slice (network slice after the change) is notified (transmitted) from the management system 300 to the base station 21 and, for example, allocation of the wireless resource to the wireless terminal 10 is executed again.

In addition, selecting the network slice to be used by the wireless terminal 10 from a plurality of network slices already generated has been described in the present embodiment. However, when the network slice (i.e., the network slice appropriate for the wireless terminal 10) which can be selected based on the above communication condition information (and the requirements from the application program) does not exist, the processing unit 302 included in the management system 300 generate a new network slice (i.e., a third network slice) to be used by the wireless terminal 10, based on the communication condition information (and the requirements from the application program). Incidentally, the network slice is generated by, for example, selecting the function group corresponding to the service (type) allocated to the network slice in response to the requirements from the application program and by allocating resource (i.e., calculation resources and wireless resources) based on the requirements from the application program and the conditions of wireless communication (communication condition information). Incidentally, the resources allocated to the network slices are determined for each network slice, but can also be dynamically changed.

When the network slice is thus newly generated, the identifier for identifying the network slice is transmitted from the management system 300 to the base station 21 and the allocation of the wireless resource to the wireless terminal 10, based on the identifier, is executed at the base station 21.

Incidentally, when the conditions of wireless communication are changed after the network slice is once selected, as described above, the network slice (first network slice) used by the wireless terminal 10 may be divided into a plurality of network slices in accordance with the change. In this case, the processing unit 302 included in the management system 300 abandons (deletes) the network slice used by the wireless terminal 10 and generates a plurality of new network slices. When one network slice is thus divided into a plurality of network slices, an identifier for identifying one of the plurality of divided network slices is transmitted from the management system 300 to the base station 21.

Furthermore, when the conditions of wireless communication are changed after the network slice is once selected, the network slice (first network slice) used by the wireless terminal 10 may be integrated with the other network slice (second network slice) in accordance with the change. In this case, the processing unit 302 included in the management system 300 abandons the network slice used by the wireless terminal 10 and the other network slice and generates a new network slice (third network slice) by integrating the two network slices. When two network slices are thus integrated into one network slice, an identifier for identifying the integrated network slice is transmitted from the management system 300 to the base station 21.

As described above, a plurality of network slices configuring the core network 30 may be generated in advance by assuming various services provided in the mobile communication system or may be increased or decreased while running the mobile communication system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A system comprising:
a base station communicably connected to a wireless terminal, and
a management system managing a first network slice and a second network slice which can be used by the base station,
wherein:
the base station includes:
a first processor configured to acquire communication condition information indicating conditions of wireless communication with the wireless terminal; and
a first transmitter configured to transmit the communication condition information to the management system, and
the management system includes:
a second receiver configured to receive the communication condition information;
a second processor configured to execute a process of selecting a network slice to be used by the wireless terminal, from the first network slice and the second network slice, based on the communication condition information, a calculation resource allocated to each of the first network slice and the second network slice, and a physical distance between a location of the base station and a location where each of the first network slice and the second network slice is configured; and
a second transmitter configured to transmit identification information identifying the selected network slice to the base station.

2. The system of claim 1, wherein:
the base station includes a first receiver configured to receive the identification information from the management system, and
the first processor is configured to, if the first receiver receives, as the identification information, first identification information identifying the first network slice as the network slice used by the wireless terminal, allocate a first wireless resource to the wireless terminal based on the first identification information and, if the first receiver receives, as the identification information, second identification information identifying the second network slice as the network slice used by the wireless terminal, allocate a second wireless resource different from the first wireless resource to the wireless terminal based on the second identification information.

3. The system of claim 1, wherein:
the first network slice comprises communication characteristics comprising at least one of high speed, multiple connection, and low latency, and
the second network slice comprises communication characteristics which comprise at least one of high speed, multiple connection, and low latency and which are different from the communication characteristics of the first network slice.

4. The system of claim 1, wherein:
the first processor is configured to acquire a requirement on wireless communication based on an application program running at the wireless terminal, and
the first transmitter transmits the requirement to the management system.

5. The system of claim 1, wherein the communication condition information comprises information on a physical layer of wireless communication with the wireless terminal.

6. The system of claim 5, wherein the information on the physical layer comprises at least one of a number of wireless terminals connected to the base station, a transmission speed, an error rate, a latency, a retransmission rate, a traffic volume of the wireless communication, and a number of antennas provided at the wireless terminal and the base station.

7. A method executed by a system comprising a base station communicably connected to a wireless terminal and a management system managing a first network slice and a second network slice which can be used by the base station, the method comprising:
acquiring, by the base station, communication condition information indicating conditions of wireless communication between the wireless terminal and the base station;
transmitting, by the base station, the communication condition information to the management system;
receiving, by the management system, the communication condition information;

executing, by the management system, a process of selecting a network slice to be used by the wireless terminal, from the first network slice and the second network slice, based on the communication condition information, a calculation resource allocated to each of the first network slice and the second network slice, and a physical distance between a location of the base station and a location where each of the first network slice and the second network slice is configured; and transmitting, by the management system, identification information identifying the selected network slice to the base station.

8. The method according to claim 7, further comprising:
receiving, by the base station, the identification information from the management system,
if the base station receives, as the identification information, first identification information identifying the first network slice as the network slice used by the wireless terminal, allocating, by the base station, a first wireless resource to the wireless terminal based on the first identification information, and
if the base station receives, as the identification information, second identification information identifying the second network slice as the network slice used by the wireless terminal, allocating, by the base station, a second wireless resource different from the first wireless resource to the wireless terminal based on the second identification information.

9. A system comprising:
a receiver configured to receive communication condition information indicating conditions of wireless communication between a wireless terminal and a base station from the base station;
a processor configured to execute a process of selecting a network slice to be used by the wireless terminal, from a first network slice and a second network slice which can be used by the base station, based on the communication condition information, a calculation resource allocated to each of the first network slice and the second network slice, and a physical distance between a location of the base station and a location where each of the first network slice and the second network slice is configured; and
a transmitter configured to transmit identification information identifying the selected network slice to the base station.

10. The system of claim 9, wherein:
the processor is configured to change the first network slice to the second network slice when the conditions of the wireless communication indicated by the communication condition information are changed after the first network slice is selected as the network slice used by the wireless terminal, and
the transmitter is configured to transmit identification information identifying the second network slice to the base station.

11. The system of claim 9, wherein:
the processor is configured to generate a third network slice to be used by the wireless terminal, based on the communication condition information, when a network slice which can be selected does not exist, and
the transmitter is configured to transmit identification information identifying the third network slice to the base station.

12. The system of claim 9, wherein:
the processor is configured to divide the first network slice into a plurality of network slices when the conditions of the wireless communication indicated by the communication condition information are changed after the first network slice is selected as the network slice used by the wireless terminal, and
the transmitter is configured to transmit identification information identifying one of the plurality of divided network slices to the base station.

13. The system of claim 9, wherein:
the processor is configured to integrate the first network slice and the second network slice as a third network slice when the conditions of the wireless communication indicated by the communication condition information are changed after the first network slice is selected as the network slice used by the wireless terminal, and
the transmitter is configured to transmit identification information identifying the third network slice to the base station.

14. The system of claim 9, wherein the communication condition information comprises information on a physical layer of wireless communication between the wireless terminal and the base station.

15. The system of claim 14, wherein the information on the physical layer comprises at least one of a number of wireless terminals connected to the base station, a transmission speed, an error rate, a latency, a retransmission rate, a traffic volume of the wireless communication, and a number of antennas provided at the wireless terminal and the base station.

16. The system of claim 9, wherein:
the first network slice comprises communication characteristics comprising at least one of high speed, multiple connection, and low latency, and
the second network slice comprises communication characteristics which comprise at least one of high speed, multiple connection, and low latency and which are different from the communication characteristics of the first network slice.

17. The system of claim 9, wherein:
the receiver is configured to receive a requirement on wireless communication based on an application program running at the wireless terminal, and
the processor is configured to select a network slice to be used by the wireless terminal, based on the requirement.

18. A method executed by a management system, the method comprising:
receiving communication condition information indicating conditions of wireless communication between a wireless terminal and a base station from the base station;
executing a process of selecting a network slice to be used by the wireless terminal, from a first network slice and a second network slice which can be used by the base station, based on the communication condition information, a calculation resource allocated to each of the first network slice and the second network slice, and a physical distance between a location of the base station and a location where each of the first network slice and the second network slice is configured; and
transmitting identification information identifying the selected network slice to the base station.

* * * * *